March 4, 1969 W. K. MAMMEL 3,431,009

PICKUP DEVICE FOR SUPPORTING WORKPIECES ON A LAYER OF FLUID

Filed Jan. 6, 1967

INVENTOR
W. K. MAMMEL

BY R. P. Miller
ATTORNEY

United States Patent Office 3,431,009
Patented Mar. 4, 1969

3,431,009

PICKUP DEVICE FOR SUPPORTING WORK-PIECES ON A LAYER OF FLUID

Walter Kester Mammel, Yardley, Pa., assignor to Western Electric Company, Incorporated, New York, N.Y., a corporation of New York Filed Jan. 6, 1967, Ser. No. 607,792
U.S. Cl. 294—64 7 Claims
Int. Cl. B66c *1/00*

ABSTRACT OF THE DISCLOSURE

A pickup device has a step formed across a working face and a passageway, intersecting the step through which pressurized fluid is passed to exert a reduced pressure head on a semiconductor slice to support the slice on a layer of fluid while applying a lateral force to drive the slice against a stop.

*Background of invention*

In many manufacturing operations, there are needs for instrumentalities which will pick up a workpiece without contacting certain surfaces, such as a side or edge surface.

In the processing of semiconductor devices, such as transistors and integrated circuits, a plurality of semiconductor devices are fabricated simultaneously on a thin slice of semiconductor material. The semiconductor slice is extremely brittle and easily contaminated. In handling the slice, extreme care must be used to avoid physical damage and contamination of the slices produced by physical contact between a handling device and the slice.

Conventional pickup devices for handling semiconductor slices include tweezers and vacuum pickup devices. In using such devices to handle a semiconductor slice, contamination and physical damage of the slice can result from contact with the pickup devices, thereby reducing the number of useful semiconductor devices obtained from the slice. In applicant's copending application, Ser. No. 485,751, filed Sept. 8, 1965, there is disclosed a pressurized fluid pickup device which directs a stream of fluid against a semiconductor slice to support the slice on a layer of fluid. This device also includes a plurality of stops to limit random lateral shifting of the slice relative to the device. In fabrication or treatment of the slice, there is a need for a device that precisely locates the slice on the pickup device so that each picked up slice is positioned in the exact same location.

*Summary of the invention*

It is an object of this invention to provide a new and improved pickup device which supports a workpiece on a layer of fluid away from but in a fixed relative position with respect to a working face of the pickup device.

An additional object of the invention is to overcome the Coanda effect of fluid emanating from an orifice at the juncture between a pair of stepped surfaces formed on a pickup head so that an article is lifted and supported on a layer of fluid while the article is thrust in a predetermined direction.

Another object of this invention resides in providing a pickup device for handling a slice of material which produces a flow of fluid over the surface of the slice to produce a reduced static pressure head and a lateral force in a fixed direction on the slice to support it away from the surface of the pickup device on a layer of flowing fluid and to drive it against a stop.

With these and other objects in view, the present invention contemplates a new and improved pickup device for supporting a workpiece, such as a slice of material, on a layer of flowing fluid which exerts a lateral force on the workpiece, in a fixed direction, to drive it against a stop and maintain it in a fixed position relative to the pickup device. The pickup device includes a pickup head having a working face and a projecting step. A passageway for receiving pressurized fluid extends through the pickup head terminating in an orifice at the juncture of the working face and the step. When the pickup head is positioned adjacent to a workpiece and pressurized fluid is applied to the passageway, a flow of fluid over the surface of the workpiece produces a reduced pressure head on the workpiece to support it in an equilibrium position away from the pickup head. Due to stepped construction of the working face, a greater part of the fluid flows in a fixed direction over the working face resulting in a lateral force which drives the workpiece against a stop such as a pair of locating pins. The locating pins limit lateral movement of the slice and thus position the slice in a predetermined fixed position relative to the working face.

*Brief description of the drawing*

Other objects and advantages of the present invention will appear upon consideration of the following detailed description in conjunction with the accompanying drawings, wherein.

*Description of the preferred embodiments*

Figures 1, 2, 3, 4, 5:
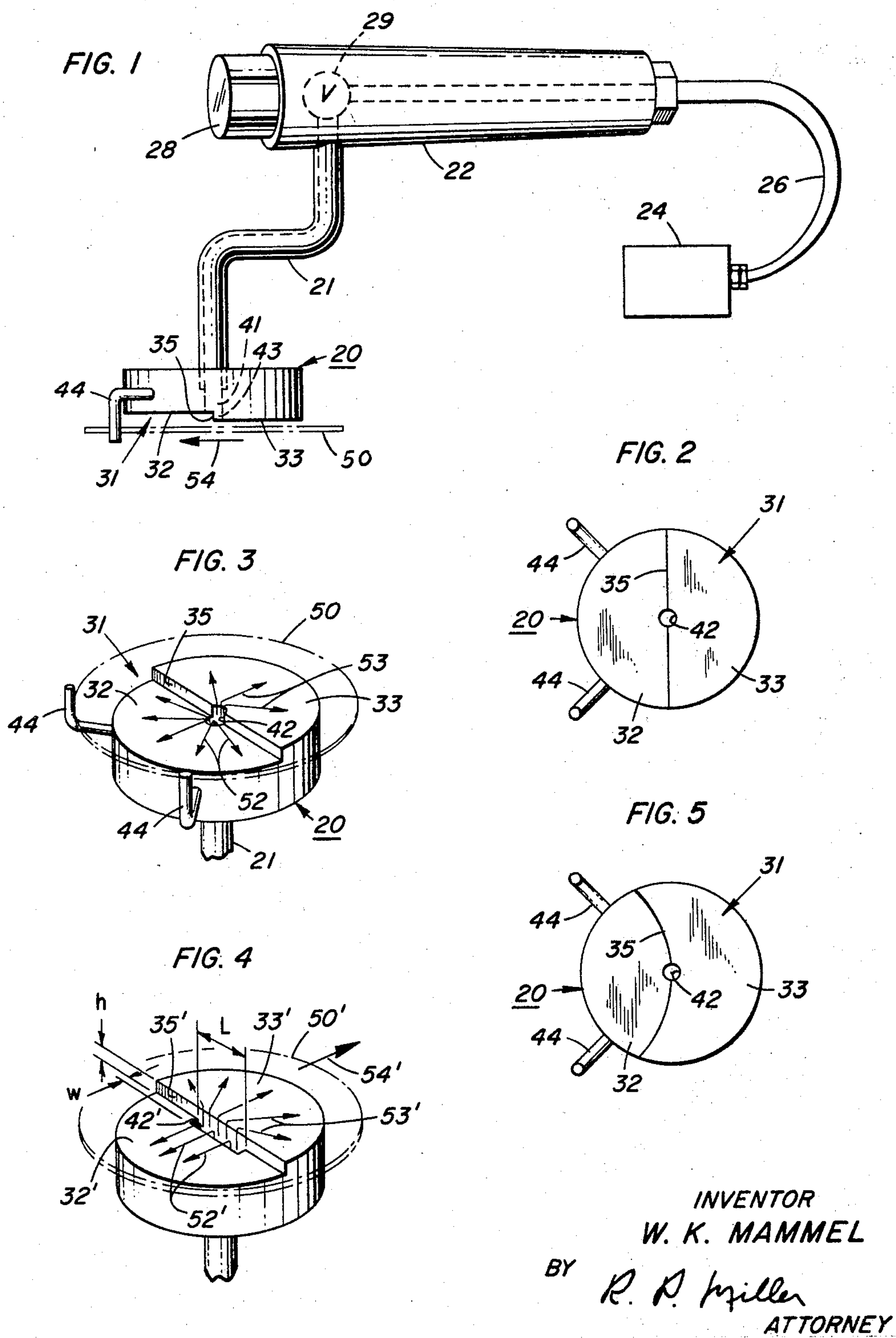
FIG. 1 illustrates a pickup device, embodying the principles of the invention, wherein a pickup head has a step formed across a working face and a passageway terminating at the working face and intersecting the step.
FIG. 2 is a plan view of the working face and the surface of the step of the pickup head.
FIG. 3 is a perspective view of the head illustrating the lateral flow of fluid over the working face and the surface of the step which is obtained when a slice is positioned adjacent to the working face and pressurized fluid is applied to the passageway.
FIG. 4 is a perspective view of a pickup head having a step formed across its working face adjoining an orifice in the form of a slot, illustrating the flow of fluid obtained over a workpiece when pressurized fluid is passed through the orifice.
FIG. 5 shows an alternative embodiment of the pickup head having a concave-shaped step formed across its working face.

In FIG. 1 there is shown a pickup device which includes a pickup head 20. The pickup head 20 is connected by a bent tube 21 to a hollow handle 22. The handle 22 is connected at one end to a source 24 of pressurized fluid by a flexible hose 26. The source 24 supplies pressurized fluid to the interior of the hollow handle 22. A push button 28, extending from the other end of the handle 22, operates a valve 29 within the handle 22 which controls the supply of pressurized fluid to the pickup head 20.

The pickup head 20 has a working face 31 (FIGS. 1, 2, and 3) which consists of a depressed planar surface 32 and a raised planar surface 33 elevated from and parallel to the surface 32. The surfaces 32 and 33 terminate in a common boundary surface or riser surface 35 forming a step across the working face 31.

A passageway 41 (FIG. 1) extends through the pickup head 20, terminating in an orifice 42 (FIGS. 2 and 3) at its working face 31 which overlaps the surfaces 32 and 33. The passageway 41 intersects the step so that a portion of the passageway 41 terminates at the depressed surface 32. An extended portion 43 (FIG. 1) of the passageway 41 terminates at the raised surface 33. A pair of L-shaped locating pins 44 (FIGS. 1, 2 and 3) project from the side of the pickup head 20. The locating pins 44 are spaced from the orifice 42 in the direction of the depressed surface 32 of the step.

In the operation of the pickup device of the present invention to lift and support a workpiece, such as a slice 50 of material (FIGS. 1 and 3), the working face 31 of the pickup head 20 is positioned adjacent to the surface of the slice 50. The push button 28 is depressed to supply pressurized fluid to the pickup head 20. The fluid flows through the passageway 41 and emerges from the orifice 42 where it is laterally deflected across the surface of the slice 50. The fluid flowing across the slice 50 results in a reduced static pressure head in the space between the working face 31 and the surface of the slice 50 in accordance with Bernoulli's principle. The difference between static pressure heads acting on the opposite surfaces of the slice 50 results in a force that draws the slice 50 toward the working face 31.

When the pressurized fluid is first applied to the surface of the slice 50, the fluid tends to flow uniformly in all radial directions from the orifice 42. As the slice 50 is drawn toward the working face 31, the fluid flowing between the working face 31 and the surface of the slice 50 encounters an increased resistance to flow. The velocity of the fluid flowing across the slice 50 decreases and, as a result, the difference between the static pressure heads also decreases. The slice 50 moves to an equilibrium position adjacent to the working face 31 where it is supported upon a layer of flowing fluid by the force generated in accordance with Bernoulli's principle.

As the slice 50 moves toward its equilibrium position, the fluid flowing over the raised surface 33 encounters more resistance to flow than the fluid flowing over the depressed surface 32. This results from the fact that the gap between the depressed surface 32 and the slice 50 is greater than the gap between the raised surface 33 and the slice 50. As a result of the difference in resistance to flow over the working face 31, the fluid emerging from the orifice 42 flows more readily over the depressed surface 32, i.e., in the direction of least resistance to flow. As the slice 50 is drawn toward the working face 31, the decrease in the flow of fluid over the depressed surface 32 (indicated by arrows 52 of FIG. 3) is less than the decrease in the flow over the raised surface 33 (indicated by arrows 53) and a greater part of the fluid flows over the depressed surface 32. An effective lateral force (indicated by arrow 54 of FIG. 1) is applied to the slice 50 in the direction of the depressed surface 32. The magnitude of this effective lateral force is determined by the difference between the amounts of fluid flowing over the depressed surface 32 and the raised surface 33. The effective lateral force drives the slice 50 against the locating pins 44 which limit its movement across the working face 31 and maintain the slice 50 in a fixed position relative to the working face 31.

In considering the operation of the present invention, it should be noted that the relationship between the dimensions of the orifice 42 and the height of the step determines the amount of fluid which flows over the raised surface 33 and the depressed surface 32 of the step. As the fluid stream emerges from the orifice 42 and is deflected by the workpiece 50, two opposing factors influence its flow. First, a portion of the stream of fluid tends to follow the path of least resistance to flow. Since the distance between the depressed surface 32 and the workpiece 50 is larger than the corresponding distance between raised surface 33 and the workpiece 50, the fluid encounters less resistance to flow when it passes over the depressed surface 32. Therefore, a first portion of the fluid stream emerging from the orifice 42 is deflected by the workpiece 50 over the depressed surface 32. Secondly, another portion of the stream of fluid emerging from the orifice 42 adjacent to the riser surface 35 of the step is affected by Coanda effect forces exerted by the riser surface 35. The Coanda forces cause a second portion of the stream of fluid to flow along the riser surface 35 to be deflected by the workpiece 50 over the raised surface 33. The dimensions of the orifice 42 and the height of the riser surface 35 determine the relative amounts of fluid affected by the two opposing factors and the resulting fluid flow pattern over the workpiece 50.

In the present invention, the size and shape of the orifice 42 and the height of the riser surface 35 are chosen such that the portion of the fluid affected by Coanda forces is relatively small. As a result, a greater portion of the fluid flows over the depressed surface 32, in the direction of least resistance to flow, thereby exerting a lateral force on a workpiece in the direction of the depressed surface 32.

If, as shown in FIG. 4, an orifice 42′ is in the form of a slot having length $l$ and width $w$, and a riser surface 35′ of height $h$ is formed adjacent to the orifice 42′ then the dimensions $l$, $w$, and $h$ can be selected such that the portion of the fluid stream affected by Coanda forces is relatively large. For example, if the length $l$ is approximately .75 inch and the width $w$ is 1.5 mils and the height $h$ is 4 mils, then a large portion of the fluid emerges adjacent to the riser surface 35′ and is affected by Coanda forces. As a result, the portion of fluid deflected by a workpiece 50′ over raised surface 33′ (indicated by arrows 53′) is greater than the portion deflected over the depressed surface 32′ (indicated by the arrows 52′). The difference in flow produces a lateral force 54′ on the workpiece 50′ which moves it over the raised surface 33′

By increasing the width $w$ of the orifice 42′, the relative effect of the Coanda forces on the fluid stream emerging from the orifice 42′ is diminished. If the width $w$ is made sufficiently large, then the Coanda forces are not controlling and a greater portion of the fluid stream follows the path of least resistance and is deflected over the depressed surface 32′. By varying the height $h$ of the riser surface 35′, the relative effect of the Coanda forces is also affected. For example, if the height $h$ is decreased to a value of 1 mil, then the effect of the Coanda forces on the fluid stream is substantially diminished. In this instance, the fluid tends to flow equally over the surfaces 32′ and 33′ since they constitute a substantially continuous planar surface. If, on the other hand, the height $h$ is increased to a relatively large value such that the distance between the depressed surface 32′ and the workpiece 50′ is very large relative to the distance between the raised surface 33′ and the workpiece 50′, then the influence of the surface 32′ on the fluid flow pattern adjacent to the workpiece 50′ is negligible. In this case, the fluid stream flowing along the riser surface 35′ blows the workpiece 50′ away from the surface 33′. In applicant's copending application, Ser. No. 607,973 entitled, "Coanda Effect Switch for Handling and Conveying Workpieces on a Layer of Fluid," filed Jan. 6, 1967, an apparatus for handling a workpiece which utilizes the Coanda effect forces is disclosed.

The pickup device maintains the slice 50 in an equilibrium position, supported upon a layer of flowing fluid and held against the locating pins 44, so long as the push button 28 is depressed. If the pressure of the fluid is sufficiently high, the forces exerted on the slice 50 by the layer of flowing fluid are sufficient to maintain the slice 50 in its equilibrium position adjacent to the working face 31 in any orientation of the pickup head 20. Thus, the pickup head 20 may be positioned such that the slice 50 is held in a horizontal position, or a vertical position, or the pickup head 20 may be turned upside down (FIG. 3) without disturbing the equilibrium position of the slice 50.

The pickup head 20 may be used to pick up slices which are initially in a horizontal position (FIG. 1) or in a vertical position. Since there are only two locating pins 44 projecting from the pickup head 20, it is not necessary to center the pickup head 20 over the slice 50 before applying the pressurized fluid. As long as the orifice 42 is located adjacent to any part of the surface of the slice 50, lifting and lateral forces are generated when the pressurized fluid is applied. The slice 50 is then drawn toward the working face 31 and the flow of fluid over the slice 50 produced by the step applies a lateral force which moves the slice 50 against the locating pins 44.

An advantage of the pickup device of the present invention is that it is not limited to handling articles such as slices of only one size. Since the locating pins 44 are positioned on only one side of the pickup head 20, a wide range of slice sizes and shapes may be handled as long as the orifice 42 is covered when the slice is forced against the locators. Another advantage of the present invention is that by applying a lateral force to the slice 50 to drive it against the locating pins 44, the slice 50 is maintained in a fixed position relative to the working face 31. For example, if the locating pins 44 are positioned at equal distances from the orifice 42, then a circular slice 50 supported by the pickup device is always suspended in a centered position relative to the working face 31.

It should be noted that it is not necessary that the step formed across the working face of the pickup head be linear in form. The step may be a curved riser surface, for example, a concave-shaped surface 35 as shown in FIG. 5.

In one example of the present invention, a pickup head (see FIGS. 1, 2 and 3) one-half inch in diameter, having a passageway 40 mils in diameter and a step 3 mils in height, was used to handle a slice of semiconductor material approximately 1¼ inch in diameter and 5 mils in thickness. It was found that the slices could easily be handled in a horizontal position by applying pressurized air to the pickup head at approximately 2 p.s.i. In order to maintain the same slice in a vertical position, the pressure of the applied air was increased to 20 p.s.i. It was also found that heavier workpieces could be handled by increasing the pressure of the applied air.

The above-described pickup device illustrates the principles of the present invention. Modifications in the device may be made by persons skilled in the art without departing from the scope of the present invention.

What is claimed is:

1. A pickup device for supporting workpieces on a layer of flowing fluid which includes:
- a pickup head having a working face consisting of a first surface and a second surface parallel to and elevated from said first surface, said surfaces terminating at a common boundary forming a step across said working face,
- said pickup head having a passageway therethrough, terminating in an orifice at said working face and intersecting said step, for conducting pressurized fluid to the surface of a workpiece positioned adjacent to said working face to produce a layer of fluid across said surface to support said workpiece away from said working face and to drive said workpiece across said working face over said first surface,
- means projecting from said pickup head for contacting the edge of said workpiece to limit its movement across said working face over said first surface, and
- means for applying fluid at sufficient pressure through said passageway and orifice to lift said workpiece and drive and hold it against said projecting means.

2. A pickup device for supporting workpieces on a layer of flowing fluid which comprises:
- a pickup head having a working face consisting of a depressed surface and a raised surface, said surfaces terminating at a common boundary forming a step across said working face,
- said pickup head having a passageway therethrough terminating in an orifice at said working face and intersecting said step, a portion of said passageway terminating at said depressed surface and an extended portion of said passageway terminating at said raised surface,
- means for applying pressurized fluid through said passageway to the surface of a workpiece to form a layer of said fluid across said surface to apply (1) an attractive force on said workpiece to support said workpiece on said layer of fluid away from said workpiece to move said workpiece across said working face in the direction of said depressed surface of said step, and
- means projecting from said pickup head and spaced from said orifice in the direction of said depressed surface for contacting the edge of said workpiece to limit its movement across said working face in the direction of said depressed surface.

3. In a pickup device for supporting slices of material on a layer of flowing fluid, as set forth in claim 2, wherein said projecting means comprises:
- a pair of locating pins projecting from said pickup head for contacting the edge of said slice to limit its movement across said working face in the direction of said depressed surface.

4. A pickup device for supporting slices of material on a layer of flowing fluid which comprises:
- a pickup head having a working face consisting of a depressed planar surface and a raised planar surface, said surfaces terminating at a common boundary forming a step across said working face,
- said pickup head having a passageway therethrough terminating in a circular orifice at said working face and intersecting said step, said circular orifice overlapping portions of said depressed and raised planar surfaces,
- means for applying pressurized fluid through said passageway to the surface of a slice positioned adjacent to said working face to produce a layer of said fluid across said surface to generate (1) an attractive force on said slice to support said said slice on said layer of said fluid away from said working face and (2) a lateral force on said slice to move said slice across said working face in the direction of said depressed surface of said step, and
- means projecting from said pickup head and spaced from said orifice in the direction of said depressed surface for contacting the edge of said slice to limit its movement across said working face in the direction of said depressed surface.

5. In a pickup device for supporting an article on a layer of fluid,
- a head having a first planar surface and a second adjacent planar surface spaced from and parallel to the first surface, and joined by a riser surface,
- said head having a passageway therethrough to provide an orifice at the juncture of the first surface and the riser surface, said orifice having a cross-sectional area of such size that fluid emanting therefrom at a predetermined pressure and impinging upon the planar surface of an article is deflected over the first planar surface with sufficient velocity to reduce the pressure head of the fluid flowing between the first planar surface and the planar surface of the article to support the article on the flowing fluid,
- said riser surface being of sufficient height to limit the Coanda effect flow of the fluid to an amount so that the flow of fluid at said predetermined pressure over the first planar surface is dominant in support the article and in imparting a thrust to the article which is in a direction away from the riser surface,
- means for impressing fluid which is at least equal to said predetermined pressure through said passageway, and
- stop means spaced from said orifice for contacting the edge of the article to limit lateral movement of the article across said first and second surfaces and to hold the article against said stop means.

6. In a pickup device for supporting a slice of material on a layer of fluid:

a pickup head having a passageway formed therethrough which terminates in an orifice at a working face of said pickup head;

means for applying pressurized fluid through said passageway to the surface of the slice to form a layer of fluid between the slice and said working face to support the slice away from said working face;

a step extending across said working face with its riser surface intersecting said orifice to establish a path of lesser resistance to fluid flow between the surface of the slice and said working face, and a path of greater resistance to fluid flow between the surface of the slice and the surface of said step such that upon application of pressurized fluid through said passageway to the slice, a greater portion of the fluid emerging from said orifice follows the path of lesser resistance to apply a lateral force to the slice in the direction of the path of lesser resistance; and means projecting from said pickup head and located in the path of lesser resistance to fluid flow at a distance spaced from said orifice for contacting the edge of the supported slice to limit its movement in the direction of lesser resistance to fluid flow such that the slice is supported in a predetermined position relative to said working face.

7. In a pickup apparatus for supporting an article having a planar surface on a layer of flowing fluid;

a pickup head having a substantially flat face which comprises first and second parallel, planar surfaces spaced apart to form a step extending across said face;

said pickup head having a passageway extending axially therethrough which terminates in an orifice located at the center of said step;

means for applying a stream of fluid through said passageway to the planar surface of an article to be picked up to laterally deflect fluid emerging from said orifice across said first and second surfaces into a layer of fluid on which the article is supported; and stop means spaced from said orifice for contacting the edge of the article to limit lateral movement of the article across said face and to hold the article against said stop means.

References Cited

UNITED STATES PATENTS

| | | | |
|---|---|---|---|
| 2,052,869 | 9/1936 | Coanda. | |
| 3,126,200 | 3/1964 | Rehm. | |
| 3,279,863 | 10/1966 | Bouladon et al. | 302—29 |

EVON C. BLUNK, *Primary Examiner.*

MATTHEW L. AJEMAN, *Assistant Examiner.*

UNITED STATES PATENT OFFICE

CERTIFICATE OF CORRECTION

Patent No. 3,431,009 March 4, 1969

Walter Kester Mammel

It is certified that error appears in the above identified patent and that said Letters Patent are hereby corrected as shown below:

Column 6, line 9, "workpiece to move said workpiece across said working face in the direction of said depressed surface of said step, and" should read -- working face and (2) a lateral force on said workpiece to move said workpiece across said workin face in the direction of said depressed surface of said step, and --; line 57, "emanting" should read -- emanating --; line 67, "support" should read -- supporting --.

Signed and sealed this 6th day of October 1970.

(SEAL)
Attest:

Edward M. Fletcher, Jr.
Attesting Officer

WILLIAM E. SCHUYLER, JR.
Commissioner of Patents